United States Patent [19]

Hunter et al.

[11] 4,049,606
[45] Sept. 20, 1977

[54] PREPARATION OF A MANNICHED POLYACRYLAMIDE QUARTERNARIES THEREOF

[75] Inventors: Wood E. Hunter, Lombard; Theodore P. Sieder, Sauk Village, both of Ill.

[73] Assignee: Nalco Chemical Company, Oak Brook, Ill.

[21] Appl. No.: 705,973

[22] Filed: July 16, 1976

[51] Int. Cl.² .............................................. C08L 61/20
[52] U.S. Cl. ........................... 260/29.4 UA; 260/72 R
[58] Field of Search ....................... 260/29.4 UA, 72 R

[56] References Cited

U.S. PATENT DOCUMENTS

| | | | |
|---|---|---|---|
| 2,328,901 | 9/1943 | Grimm | 260/72 |
| 3,323,979 | 6/1967 | Foster et al. | 162/167 |
| 3,539,535 | 11/1970 | Wisner | 260/72 |
| 3,830,655 | 8/1974 | Rothwell | 117/201 |

FOREIGN PATENT DOCUMENTS 976,671  10/1973  Canada

Primary Examiner—Theodore E. Pertilla
Attorney, Agent, or Firm—John G. Premo; Robert A. Miller; Barry W. Sufrin

[57] ABSTRACT

Cationically modified polymers of acrylamide are prepared by adding to a polyacrylamide an aqueous solution of a lower aliphatic aldehyde followed by a lower alkyl secondary amine. The pH of the dilute solution of the acrylamide polymer which is reacted is adjusted prior to addition of the aldehyde to between 4.5 and 5.5 thereby conducting this reaction at an acidic pH. Additionally, quaternized polymers may be prepared by adding to the cationically modified polyacrylamide a lower alkyl halide quaternizing agent. The pH of the solution of the cationically modified acrylamide polymer prior to quaternization should be 7.5–8.5.

12 Claims, No Drawings

PREPARATION OF A MANNICHED POLYACRYLAMIDE QUARTERNARIES THEREOF

INTRODUCTION

Cationically modified water-soluble polymers have become increasingly important in a variety of applications. Useful for emulsion breaking, water clarification, conductive additives to paper and the like, these polymers have been prepared by many diverse and useful methods. One particular type of cationic water-soluble polymer, a Manniched polyacrylamide, has gained acceptance due to its low cost and ease of preparation. A serious problem with this type of polymer, however, has been complete conversion of amide functionality to the corresponding cationic derivative. We have found that by utilizing specific pH ranges, a Manniched polyacrylamide and a quaternized Manniched polyacrylamide can be prepared in higher yields than what is heretofore been thought possible.

Prior art on the preparation of cationically modified polyacrylamide includes:

Canadian Pat. No. 976,671 discloses flocculating agents consisting of quaternized Mannich derivative of polyacrylamide. The material is made by heating polyacrylamide or methacrylamide with formaldehyde and a dialkyl amine at elevated temperature followed by quaternization of the resultant polymer. The importance of pH and temperature limitations discovered by the applicants are not mentioned and the resultant polymers, while similar to those of the applicants, have an incomplete conversion as compared to those of the applicants.

U.S. Pat. No. 3,830,655 discloses conductive papers impregnated with at least 70% quaternized dialkyl amino methylene acrylamide or methacrylamide. Again, this reference does not take into account the parameters at which this reaction is run, and it is submitted that, again, conversion to the quaternary derivative is low.

Wisner, U.S. Pat. No. 3,539,535, discloses a method for the preparation of Manniched polyacrylamide similar to that of the applicant. However, Wisner produces a solid product and pays no heed to the hydrogen ion concentration present when conducting his reaction as do the applicants. While Wisner produces a cationic polyacrylamide, the conversion of the acrylamide to the cationic form is hindered unless conducted at the pH values suggested in the instant invention.

Grimm, U.S. Pat. No. 2,328,901, also discloses the preparation of a cationic polymethacrylamide. Grimm's non-quaternized materials, while not being produced in the same manner as that of the applicant, again, are not made utilizing the particularly beneficial reaction conditions which the applicants have discovered.

Application, Ser. No. 55,467, filed Feb. 20, 1975, discloses a method for the preparation of cationically modified acrylamide polymers in latex form. Here, a premix of a lower alkyl aldehyde and a lower aliphatic secondary amine is made which is then reacted with a polyacrylamide. This reference also fails to take into account the benefits of performing this reaction at the pH's designated by the applicant and, instead, prepares the polymers at alkaline pH's due to small excesses of secondary amine being present.

In contrast to the above cited prior art, the instant invention provides a method for obtaining high yields of a catonized polyacrylamide. This is accomplished by the careful regulation of pH and close control of temperature conditions.

OBJECTS

It is, therefore, an object of this invention to provide to the art an improved method for the preparation of a cationically modified acrylamide polymer.

A further object of this invention is to provide to the art an improved method for the preparation of a cationically modified quaternized acrylamide polymer.

Other objects will appear hereinafter.

THE INVENTION

This invention provides to the art an improved method for the preparation of a cationically modified acrylamide polymer, said cationically modified polymers generally being prepared by admixing together:

a. an acrylamide polymer;

b. a lower aliphatic aldehyde containing 1–3 carbon atoms; and c. a lower alkyl secondary amine containing 2–6 carbon atoms; in a mole ratio of amide groups on said acrylamide polymer to b and c above of from 1.0:0.5:0.5 to 1.0:1.5:1.5, the improvement comprising:

A. Preparing a 5–40% by weight aqueous solution of a water soluble acrylamide polymer;

B. Adjusting the pH of said aqueous solution of a water soluble acrylamide polymer to between 4.5–5.5;

C. Adding to the aqueous solution of the acrylamide polymer with mixing an aqueous solution of a water soluble lower aliphatic aldehyde containing 1–3 carbon atoms in a mole ratio of aldehyde to amide functionality present on said acrylamide polymer of 0.5:1 to 1.1:1 whereby an aqueous acrylamide-aldehyde solution is prepared;

D. Adding to said aqueous acrylamide-formaldehyde solution with mixing a lower aliphatic secondary amine containing 2–6 carbon atoms in a mole ratio of the lower aliphatic aldehyde added to said acrylamide polymer in step C to amine of 1.0:1.0 to 1.0:1.2, whereby the secondary amine is reacted with the acrylamide-aldehyde solution and a stable cationically modified acrylamide polymer is formed; and then E. Recovering an aqueous solution of a stable cationically modified acrylamide polymer.

In addition, this invention is also useful in the preparation of a quaternized cationically modified polyacrylamide which is prepared by adding to the solution of a cationically modified acrylamide polymer prepared above with mixing a sufficient quantity of a mineral acid so as to adjust the pH of said dilute solution of a cationically modified acylamide polymer to 7.5–8.5, adding to said dilute solution of a cationically modified acrylamide polymer with mixing having a pH of 7.5–8.5 at a temperature of from 80°–120° F. a quaternizing agent from the group consisting of lower alkyl halides containing 1–4 carbon atoms, in a mole ratio of quaternizing agent to secondary amine added in step 1 above of from 1.0:1.0 to 1.25:1.0, maintaining a temperature of from 80°–120° F. for a period of time necessary in order to carry out said quaternization, and then, recovering a dilute solution of a water soluble quaternized cationically modified acrylamide polymer.

Acrylamide Polymers

The acrylamide polymers useful in this invention may be either copolymers of polyacrylamide with other water-soluble vinyl addition monomers, or polyacrylamide itself. In the case of a copolymer, the resultant polymer should contain at least 25% acrylamide and preferably 50% acrylamide. Most preferably, 75% by weight acrylamide should be incorporated into the polymer. Water-soluble comonomers which may be useful in the subject of this invention include acrylic acid and its sodium and potassium salts, dimethylaminoethyl methacrylate, diallyldimethyl ammonium chloride, methacrylic acid and its soluble salts, and other cationically or nonionically charged water-soluble monomers. The molecular weights of the polymers employed should be in the range of from 1,000 to 50,000,000 or higher. Preferably, molecular weight will be in the range of 2,500–1,000,000 and most preferably for the solution polymers of this invention between 5,000 and 500,000.

These polymers are prepared by well-known solution polymer techniques, generally using a red-ox catalyst and the preparation of this type of polymer will be well known to those skilled in the art. In a preferred method for the practice of this invention, a 1–50% solution of acrylamide in water and preferably a 5–40% by weight solution is subjected to red-ox polymerization. The preferred initiators useful are generally added at a level from 0.1–10% by weight based on the monomer and preferably from 0.1–2.0% by weight. Generally, the catalyst system employed is a water-soluble persulfate, generally ammonium persulfate in conjunction with an alkali metal bisulfite, preferably sodium bisulfite reducing agent. It is also a preferred practice within the course of this invention to buffer the polymerization at a pH of from 4.0–8.5 and preferably from 4.0–7.0. Once the acrylamide polymer is formed, it is subjected to further reaction with a water-soluble lower aliphatic aldehyde containing 1–3 carbon atoms.

Aldehyde Addition

Prior to the addition of aldehyde to commence the preparation of the cationically modified acrylamide polymer, the pH of the water-soluble acrylamide polymer solution should be adjusted to between 4.5–5.5 and preferably from 5.0–5.2. This can be accomplished by utilizing, as necessary, mineral acids to lower the pH and caustic to raise the pH as necessary. It is not important what mineral acid or caustic is selected, however, the acid or base chosen should not react with the aldehyde, acrylamide or reaction product. The water-soluble lower aliphatic aldehyde containing 1–3 carbon atoms is then added with mixing to the solution of the acrylamide polymer in a mole ratio of aldehyde to amide functionality present on said acrylamide polymer of 0.5:1 to 1.1:1 and preferably from 0.75:1 to 1.0:1.0. In the preferred practice of this invention, the reaction is carried out at a temperature from 25°–85° C. and most preferably from 35° to 65° C. Aldehydes useful for the preparation of the aqueous acrylamide-aldehyde solutions include formaldehyde, propionaldehyde, and acetaldehyde.

The preferred aldehyde is formaldehyde which is generally used in a 37% aqueous solution. Once the acrylamide-aldehyde solution is prepared, it is reacted with a lower aliphatic secondary amine containing 2-6 carbon atoms so as to prepare the cationically modified acrylamide polymer.

Amine Addition

After the acrylamide polymer-aldehyde solution is prepared, a lower aliphatic secondary amine containing 2-6 carbon atoms is then added to the solution with mixing. The secondary amine can be added neat or as an aqueous solution, preferably keeping the concentration as high as possible. Useful secondary amines for the course of this invention include but are not limited to dimethylamine, diethylamine and dipropylamine. The preferred secondary amine for use in this invention is dimethylamine. When dimethylamine is used, it can be added either as the anhydrous gas or as a concentrated aqueous solution containing from 20–70% by weight dimethylamine. The amine is generally added in a mole ratio to the amount of lower aliphatic aldehyde added to the acrylamide polymer above at a ratio of 1.2:1.0 to 1.0:1.0. This reaction also is generally quite rapid and when the amine has reacted, a stable cationically modified acrylamide polymer is recovered. It is noted that with the use of the low pH for the addition of the aldehyde to the acrylamide polymer yields are obtained which are much higher than those previously obtained using starting pHs on the alkaline side which have been conventional in the prior art. It is pointed out that it is important within the practice of this invention that the pH should be adjusted as above stated. With this method, generally 10–15% more cationically modified groups can be incorporated onto the polymer backbone than heretofore thought possible.

The cationically modified acrylamide polymer prepared by the above method may be used as is in a variety of applications, or may be quaternized. When it is desired to use the polymer without quaternization, the pH of the resulting cationically modified polyacrylamide solution should be kept to a level of between 9.5–10.0 to insure an increase in the storage stability of this product. When the polymer is to be quaternized, this step is both unnecessary and undesirable since the pH of conducting the quaternization reaction is between 7.0 and 8.5.

Quaternized Cationically Modified Acrylamide Polymer

If desired, the cationically modified acrylamide polymer above may be quaternized thereby causing the resultant polymer to exhibit cationic charge at acidic pH values. Quaternization is generally conducted by adjusting the pH of the cationically modified acrylamide polymer solution to between 7.0 and 8.5 and preferably between 7.5 and 8.5. This can be accomplished by adding a sufficient quantity of mineral acid to adjust the pH of the now alkaline cationically modified polymer to this level. Most preferably, the pH of the cationically modified acrylamide polymer is adjusted to between 8.0 and 8.5.

A lower alkyl halide quaternizing agent containing 1–4 carbon atoms is then added to the cationically modified acrylamide polymer solution at a temperature of 80°–120° F. in a mole ratio of quaternizing agent to secondary amine added during the preparation of the cationically modified acrylamide polymer of 1.0:1.0 to 1.25:1.0.

Lower alkyl halide quaternization agents useful in the course of this reaction include methyl chloride, ethyl chloride, propyl chloride, and butyl chloride. Other quaternization agents which may be useful include dimethyl sulfate. In addition to the above, iodide and bromide derivatives may be useful. It is preferred that the quaternization agent be added rapidly to the reaction.

The quaternization agent should be added to the reactor in as rapid a time as possible so as to minimize contacting the quaternized cationically modified acrylamide polymer at a high pH which can degrade the polymer. It is thus preferred that the quaternization agent be added as rapidly as possible and with agitation so as to affect the reaction thereby producing a halide or sulfate acid which will lower the pH and increase the stability of the resultant quaternized cationically modified polyacrylamide.

The quaternization reaction is generally rapid, and while quaternization does not proceed at room temperature, it is preferred to conduct the reaction at somewhat elevated temperature in order to expedite the quaternization so as to more rapidly cause the lowering of the pH. Many of the quaternization agents employed will be gasses at the temperatures at which the reaction is conducted, and suitable pressurized equipment is required. After the quaternization reaction has proceeded, the quaternized cationically modified polyacrylamide is recovered. The polymer will generally have a pH of from 4.0 to 7.0 depending on the quantity of secondary amine used during the preparation of the Manniched product prior to quaternization. In order to increase the stability of the quaternized material, it is preferred to lower the pH to between 3.0 and 5.5 and most preferably to an approximate pH of 4.0.

The temperature of the reaction is then held at 80°-120° F. for a period of time necessary to carry out the quaternization at which time a dilute solution of a water-soluble quaternized cationically modified acrylamide polymer is recovered.

In order to show the relative merits of the instant invention, the following examples are presented.

Solution polymers of acrylamide were prepared in standard laboratory equipment using an ammonium persulfate and sodium bisulfite catalyst system. Polymerizations were conducted at approximately 20% by weight monomer concentration. Runs preparing the Manniched polyacrylamide were conducted into a two liter reactor equipped with stirrer, thermometer, condenser and addition funnel. For runs utilizing anhydrous dimethylamine, a two liter pressurized reactor was employed. The amine was fed through a Jurgensen gauge. For quaternization reactions, it was necessary to use a two liter autoclave. Methyl chloride was fed through a Jurgensen gauge and metered into the reactor through a Lapp pump.

Procedure for Preparing the Cationically Modified Acrylamide Polymer

To a two liter resin flask was charged 947 grams of a solution containing 20% by weight polyacrylamide which was at pH 5.0. This material was heated to 30°-35° C. with agitation, at which time 216 grams of a 37% aqueous solution of formaldehyde was added drop-wise over a period of 30 minutes. After holding at this temperature for 15 minutes, 300 grams of a 40% aqueous solution of dimethylamine was added dropwise holding the temperature below 48°-50° C. The addition of the dimethylamine took approximately 2-3 hours. After two hours additional time during which the reaction was maintained at 50° C., the solution was cooled.

For runs utilizing anhydrous dimethylamine, the polymer solution was charged to the autoclave. With agitation, formaldehyde was poured into the reactor and 120 grams of anhydrous dimethylamine was added through a needle valve. Addition time of the DMA was approximately three hours and the reaction was held for an additional two hours after the completion of the reaction.

Preparation of the Cationically Modified Quaternized Polyacrylamide

For runs which were quaternized, 915 grams of a 23.6% active Mannich solution as prepared above were added to a two liter autoclave. Sulfuric acid (concentrated) was added to adjust the pH of the Mannich solution as necessary. Generally, about 12.0 grams was required to adjust the pH to 8.3. The resultant solution was then heated to a temperature of between 80°-110° F. at which time 83 grams of methyl chloride was pumped in over the time indicated in the accompanying table. After three hours of additional time, the solution was cooled, the reactor vented, and the contents discharged. Results are shown in the accompanying table. The percent Manniched and the percent quaternized were determined by colloid titration.

| Example | (10) °C. Temp. | Mole Ratio Polyacrylamide: CH$_2$O: (CH$_3$)$_2$NH | Order of Addn. (First) | (1) /n/ Polymer | (2) /n/ Rct. Polymer | (3) % Active | (4) % Cationic | (5) Quat. pH | (6) Temp. °C. | (7) Addn. Time CH$_3$Cl Hrs. | (8) % Quat. | (9) /n/ |
|---|---|---|---|---|---|---|---|---|---|---|---|---|
| 1 | 50° | 1.0:1.0:1.0 | CH$_2$O | 0.48 | 0.39 | 23.6 | 98.6 | | | | | |
| 2 | 50 | 1.0:1.1:1.0 | CH$_2$O | 0.48 | 0.39 | 23.6 | 94.3 | | | | | |
| 3 | 50 | 1.0:1.0:1.1 | CH$_2$O | 0.48 | 0.38 | 23.6 | 104.3 | | | | | |
| 4 | 35 | 1.0:1.0:1.0 | CH$_2$O | 0.48 | 0.36 | 23.6 | 105.6 | | | | | |
| 5 | 65 | 1.0:1.0:1.0 | CH$_2$O | 0.48 | 0.40 | 23.6 | 100.0 | | | | | |
| 6 | 50 | 1.0:1.1:1.1 | CH$_2$O | 0.48 | 0.43 | 23.6 | 94.3 | | | | | |
| 7 | 35 | 1.0:1.0:1.0 | DMA | 0.48 | 0.44 | 23.6 | 94.3 | | | | | |
| 8 | 50 | 1.0:0.9:0.9 | CH$_2$O | 0.48 | 0.41 | 23.6 | 106.7 | | | | | |
| 9 | 50 | 1.0:1.0:1.0 | CH$_2$O | | 0.56 | 23.6 | 105.7 | 9.9 | 85 | 2.5 | 84.2 | 0.53 |
| 10 | 50 | 1.0:1.0:1.0 | CH$_2$O | | | 23.6 | 102.7 | 9.9 | 100 | 5.5 | 51.1 | |
| 11 | 50 | 1.0:1.0:1.0 | CH$_2$O | | | 23.6 | 101.5 | 9.9 | 85 | 3.0 | 90.2 | 0.37 |
| 12 | 50 | 1.0:1.0:1.0 | CH$_2$O | | | 23.6 | 101.5 | | | | | |
| 13 | 50 | 1.0:1.0:1.0 | CH$_2$O | | | 23.6 | 101.5 | 10.0 | 110 | 5.5 | 70.7 | — |
| 14 | 50 | 1.0:1.0:1.0 | CH$_2$O | | | 23.6 | | 8.0 | 106 | 0.25 | 88.7 | 0.48 |
| 15 | 50 | 1.0:1.1:1.1 | CH$_2$O | | | 23.6 | 97.3 | 9.5 | 85 | 1.0 | 84.2 | 0.42 |
| 16 | 50 | 1.0:1.1:1.0 | CH$_2$O | | | 23.6 | 100.0 | 9.5 | 88 | 1.0 | 84.2 | 0.40 |
| 17 | 50 | 1.0:1.1:1.0 | DMA | | | 23.6 | 94.6 | 9.5 | 85 | 2.0 | 76.7 | — |
| 18 | 50 | 1.0:0.9:1.0 | CH$_2$O | | | 23.6 | 98.6 | 9.5 | 85 | 1.6 | 90.9 | 0.40 |
| 19 | 50 | 1.0:1.0:1.1 | CH$_2$O | | | 23.6 | 102.8 | 9.5 | 85 | 1.25 | 81.2 | 0.45 |
| 20 | 50 | 1.0:0.9:0.9 | CH$_2$O | | | 23.6 | 94.6 | 9.5 | 85 | 1.5 | 85.8 | 0.41 |
| 21 | 50 | 1.0:1.0:0.9 | CH$_2$O | | | | 90.4 | 9.5 | 85 | 1.25 | 96.3 | 0.48 |
| 22 | 50 | 1.0:1.0:1.0 | CH$_2$O | | | 27.0 | 104.7 | 8.2 | 110 | 2.0 | 92.9 | 0.53 |

-continued

| Example | (10) °C. Temp. | Mole Ratio Polyacrylamide: $CH_2O$: $(CH_3)_2NH$ | Order of Addn. (First) | (1) /n/ Polymer | (2) /n/ Rct. Polymer | (3) % Active | (4) % Cationic | (5) Quat. pH | (6) Temp. °C. | (7) Addn. Time $CH_3Cl$ Hrs. | (8) % Quat. | (9) /n/ |
|---|---|---|---|---|---|---|---|---|---|---|---|---|
| 23 | 50 | 1.0:1.0:1.0 | $CH_2O$ | | | 27.0 | 100.0 | 9.9 | 85 | 1.5 | 55.8 | — |
| 24 | 50 | 1.0:1.0:1.0 | $CH_2O$ | | 0.58 | 27.0 | 100.0 | 9.9 | 85 | 0.5 | 78.1 | — |
| 25 | 50 | 1.0:1.0:1.0 | DMA | | | 27.0 | 95.1 | 9.9 | 85 | 1.0 | 57.5 | — |
| 26 | 50 | 1.0:1.0:1.0 | DMA | 0.48 | — | 20.5 | 87.0 | 8.25 | 115 | 0.3 | 66.1 | 0.39 |
| 27 (11) (12) | 50 | 1.0:1.0:1.0 | DMA | 0.48 | | 20.5 | 87.0 | 9.7 | 108 | 0.42 | 66.2 | 0.39 |
| 28 (11) | 50 | 1.0:1.0:1.0 | DMA | 0.48 | — | 20.5 | 87.0 | 9.7 | 110 | 1.08 | 58.6 | 0.39 |
| 29 (11) | 50 | 1.0:1.0:1.0 | DMA | 0.48 | — | 20.5 | 87.0 | 9.7 | 85 | 1.25 | 63.2 | 0.39 |
| 30 (11) | 50 | 1.0:1.0:1.0 | DMA | 0.48 | | 20.5 | 87.0 | 7.9 | 110 | 1.0 | 63.1 | — |
| 31 | 50 | 1.0:1.0:1.0 | $CH_2O$ | 0.53 | | 23.6 | 100.0 | 9.9 | 85 | 1.08 | 84.2 | 0.45 |
| 32 | 50 | 1.0:1.0:1.0 | $CH_2O$ | 0.53 | | 23.6 | 100.0 | 9.9 | 110 | 2.33 | 59.8 | 0.39 |
| 33 | 50 | 1.0:1.0:1.0 | $CH_2O$ | 0.53 | | 23.6 | 100.0 | 9.0 | 110 | 2.33 | 61.7 | 0.38 |
| 34 | 50 | 1.0:1.0:1.0 | $CH_2O$ | 0.53 | | 23.6 | 100.0 | 8.5 | 110 | 2.5 | 79.8 | 0.35 |
| 35 | 50 | 1.0:1.0:1.0 | $CH_2O$ | 0.53 | | 23.6 | 100.0 | 8.0 | 110 | 2.5 | 79.8 | 0.35 |
| 36 | 50 | 1.0:1.0:1.0 | $CH_2O$ | 0.53 | | 23.6 | 100.0 | 8.3 | 85 | 2.5 | 75.2 | 0.33 |
| 37 | 50 | 1.0:1.0:1.0 | $CH_2O$ | 0.53 | | 23.6 | 100.0 | 8.3 | 110 | 2.25 | 78.2 | 0.34 |
| 38 | 50 | 1.0:1.0:1.0 | $CH_2O$ | 0.53 | | 23.6 | 100.0 | 8.2 | 110 | 1.5 | 75.2 | 0.36 |

(1) Intrinsic viscosity of polyacrylamide used
(2) Intrinsic viscosity of Mannich ed polyacrylamide
(3) % Active cationalically modified polymer in solution
(4) % Cationic - By colloid titration
(5) pH of quaternization
(6) Temperature of quaternization
(7) Addition time $CH_3Cl$
(8) % Quat - by colloid titration
(9) Intrinsic viscosity quaternized polymer
(10) Reaction temp. of Mannich
(11) 25% xs $CH_3Cl$
(12) Anhydrous DMA utilized

We claim:

1. An improved method for the preparation of a cationically modified acrylamide polymer, said cationically modified polymers generally being prepared by admixing together:
   a. an acrylamide polymer;
   b. a lower aliphatic aldehyde containing 1-3 carbon atoms; and
   c. a lower alkyl secondary amine containing 2-6 carbon atoms; in a mole ration of amide groups on said acrylamide polymer to b and c above of from 1.0:0.5:0.5 to 1.0:1.5:1.5, the improvement comprising:
   A. Preparing a 5-40% by weight aqueous solution of a water soluble acrylamide polymer;
   B. Adjusting the pH of said aqueous solution of a water soluble acrylamide polymer to between 4.5-5.5;
   C. Adding to the aqueous solution of the acrylamide polymer with mixing, an aqueous solution of a water soluble lower aliphatic aldehyde containing 1-3 carbon atoms in a mole ratio of aldehyde to amide functionality present on said acrylamide polymer of 0.5:1 to 1.1:1 whereby an aqueous acrylamide-aldehyde solution is prepared;
   D. Adding to said aqueous acrylamide-formaldehyde solution with mixing a lower aliphatic secondary amine containing 2-6 carbon atoms in a mole ratio of the lower aliphatic aldehyde added to said acrylamide polymer in step C to amine of 1.0:1.0 to 1.0:1.2, whereby the secondary amine is reacted with the acrylamide-aldehyde solution and a stable cationically modified acrylamide polymer is formed; and then,
   E. Recovering an aqueous solution of cationically modified acrylamide polymer.

2. The improvement of claim 1 wherein the pH of said aqueous solution of a water soluble acrylamide polymer is 5.0-5.2.

3. The improvement of claim 1 wherein the secondary amine is dimethyl amine.

4. The improvement of claim 1 wherein the aldehyde is formaldehyde.

5. The improvement of claim 1 wherein the aqueous solution of the acrylamide polymer is maintained at a temperature of from 35° C. to 65° C. during the addition of the aldehyde.

6. An improved method for the preparation of a cationically modified quaternized acrylamide polymer, said cationically modified quaternized polymers generally being prepared by admixing together.
   a. an acrylamide polymer;
   b. a lower aliphatic aldehyde containing 1-3 carbon atoms; and
   c. a lower alkyl secondary amine containing 2-6 carbon atoms; in a mole ratio of amide groups on said acrylamide polymer to b and c above of from 1.0:0.5:0.5 to 1.0:1.5:1.5, and then quaternizing the resultant cationically modified acrylamide polymer, the improvement comprising:
   A. Preparing a 5-40% by weight aqueous solution of a water soluble acrylamide polymer;
   B. Adjusting the pH of said aqueous solution of a water soluble acrylamide polymer to between 4.5-5.5;
   C. Adding to the aqueous solution of a acrylamide polymer with mixing, an aqueous solution of a water soluble lower aliphatic aldehyde containing 1-3 carbon atoms in a mole ratio of aldehyde to amide functionality present on said acrylamide polymer of 0.5:1 to 1.1:1 whereby an aqueous acrylamide-formaldehyde solution is prepared;
   D. Adding to said aqueous acrylamide-formaldehyde solution with mixing a lower aliphatic secondary amine containing 2-6 carbon atoms in a mole ratio of the lower aliphatic aldehyde added to said acrylamide polymer in step C to amine of 1.0:1.0 to 1.0:1.2, whereby the secondary amine is reacted with the acrylamide-formaldehyde solution and a cationically modified acrylamide polymer is formed;

E. Adding to said dilute solution of a cationically modified acrylamide polymer with mixing a sufficient quantity of a mineral acid so as to adjust the pH of said dilute solution of a cationically modified acylamide polymer to 7.5–8.5;

F. Adding to said dilute solution of a cationically modified acrylamide polymer with mixing and at a temperature of from 80°–120° F. a quaternizing agent from the group consisting of lower alkyl halides containing 1–4 carbon atoms, in a mole ratio of quaternizing agent to secondary amine added in step 1 above of from 1.0:1.0 to 1.25:1.0;

G. Maintaining a temperature of from 80°–120° F. for a period of time necessary in order to carry out said quaternization; and then, H. Recovering a dilute solution of a water soluble quaternized cationically modified acrylamide polymer.

7. The improvement of claim 6 wherein the pH of said aqueous solution of a water soluble acrylamide polymer in Step B is 5.0–5.2.

8. The improvement of claim 6 wherein the secondary amine is dimethyl amine.

9. The improvement of claim 6 wherein the lower aliphatic aldehyde is formaldehyde.

10. The improvement of claim 6 wherein the aqueous solution of the acrylamide polymer is maintained at a temperature of from 35° C. to 65° C. during the addition of the lower aliphatic aldehyde.

11. The improvement of claim 6 wherein the lower alkylhalide is methyl chloride.

12. The improvement of claim 6 wherein the pH of said dilute solution of a cationically modified acrylamide polymer is adjusted to a pH of 8.0–8.5 in Step E.

* * * * *